US008013846B2

(12) United States Patent
Bayramoglu et al.

(10) Patent No.: US 8,013,846 B2
(45) Date of Patent: Sep. 6, 2011

(54) TOUCH DETECTION

(75) Inventors: Gokalp Bayramoglu, Pleasanton, CA (US); Nihat Deniz Bayramoglu, Pleasanton, CA (US)

(73) Assignee: TPK Holding Co., Ltd., George Town Grand Cayman (KY)

( * ) Notice: Subject to any disclaimer, the term of this patent is extended or adjusted under 35 U.S.C. 154(b) by 1004 days.

(21) Appl. No.: 11/700,350

(22) Filed: Jan. 30, 2007

(65) Prior Publication Data

US 2007/0188476 A1 Aug. 16, 2007

Related U.S. Application Data

(60) Provisional application No. 60/771,681, filed on Feb. 10, 2006.

(51) Int. Cl.
*G06F 3/043* (2006.01)

(52) U.S. Cl. ...... 345/177; 345/178; 345/173; 178/18.04

(58) Field of Classification Search .................. 345/177; 178/18.04
See application file for complete search history.

(56) References Cited

U.S. PATENT DOCUMENTS

| | | | | |
|---|---|---|---|---|
| 5,054,005 | A * | 10/1991 | Schorum | 367/127 |
| 5,691,959 | A * | 11/1997 | Kriewall et al. | 367/129 |
| 5,986,224 | A * | 11/1999 | Kent | 178/18.04 |
| 6,922,642 | B2 * | 7/2005 | Sullivan | 702/56 |
| 7,254,775 | B2 * | 8/2007 | Geaghan et al. | 715/701 |
| 2005/0012724 | A1 | 1/2005 | Kent | |
| 2006/0139339 | A1 * | 6/2006 | Pechman et al. | 345/177 |

* cited by examiner

*Primary Examiner* — Richard Hjerpe
*Assistant Examiner* — Sahlu Okebato
(74) *Attorney, Agent, or Firm* — Gokalp Bayramoglu; Anna Tsang

(57) ABSTRACT

A touch detection device for detecting touches on a given surface. The inventive device includes a surface where a touch generates acoustic waves, transducers that detect these waves, a controller that calculate the location of the touch and a host device where the touch position is used to communicate with the application program. The screen is formed from any material that is capable of propagating acoustic waves. Plurality transducers are placed on the screen. These transducers detect acoustic waves generated on the screen. The screen is calibrated by touching it once and a map of arrival time ratios are generated and saved in the storage unit. During the real time operation, a touch on the screen generates acoustic waves that are detected by transducers. The output of each transducer is sent to a controller unit where the time differences and their ratios are calculated and compared to time ratios in the storage unit to detect the touch location.

21 Claims, 4 Drawing Sheets

2
D1
D2
P(X,Y)
D3
D4
5
4
1

TOUCH DETECTION

This application claims the benefit of U.S. Provisional Application No. 60/771,681 Feb. 10, 2006.

BACKGROUND OF THE INVENTION

1. Field of the Invention

The present invention relates generally to touch detection and more specifically it relates to a touch detection system for detecting touches on a given surface.

2. Description of the Related Art

Touch detection has been in use for years. Typically, touch detection is comprised of products that determine the location of a touch based on resistive, capacitive, infrared, surface acoustic waves, force and bending waves. Those devices that utilize acoustic waves to determine the touch location are based on either by measuring the time of flight or by measuring the phase differences and/or characterizing the screen.

U.S. Pat. No. 6,922,642 teaches how to generate acoustic waves on a surface that is capable of transmitting acoustic waves. Furthermore, this patent teaches how to generate dispersion corrected convolution function, dispersion corrected correlation function and other phase equivalent functions to determine information related to contact on the surface. This approach does not characterize the screen in advance and uses real time signals to determine the touch location. Reflections from the substrate boundaries cause detection problems therefore certain materials that reduces these reflections are required on the edges of the screen.

U.S. Pat. No. 6,871,149 discloses how to use phase differences in detected signals to determine the touch location on a given surface. At least two pairs of transducers are required to detect acoustic waves generated on a surface. These signals are processed to determine the phase and then phase differences between these signals are used to determine the touch location.

WO 00/38104 World Patent Application teaches how to detect the position of a touch on a large surface. The application discusses how acoustic waves can be generated either by using a hard object or finger (either nail or skin of the finger) and then how these acoustic waves are analyzed to determine the touch location.

US Patent Application 2005/0083313 teaches how to detect the location of a touch by using phase information. During the characterization process, phase of the arriving signals for right and left channels are determined and then the differences between these phases are calculated and stored in a memory. When the surface is touched in real time application, phase differences between the right and the left channels are calculated and compared with the phase differences stored in the memory. This approach has two shortcomings. First, the entire screen has to be touched at several locations to characterize it. This requires additional time during manufacturing, and has a detrimental effect on productivity. Secondly, more memory is necessary, resulting in increased cost for producing larger screens.

US Patent Application 2005/02127777 teaches how to characterize a surface and store the characterized data in memory. Different techniques are disclosed including how to compare measured phase differences with stored phase differences to detect the touch location.

WO01148684 teaches how to detect acoustic waves on a given surface and how to use the measured data to construct a non-dispersive signal to determine the touch location.

U.S. Pat. No. 6,456,952 teaches how to characterize a touch screen to prevent drifting.

U.S. Pat. No. 6,977,646 discloses how to calibrate for a touch screen.

U.S. Pat. No. 5,751,276 teaches how to perform calibration on a touch screen and how to save those numbers in memory location to be used later.

U.S. Pat. No. 6,353,434 teaches how to perform calibration on a touch screen and how to store calibration data in a memory location to be used later.

U.S. Pat. No. 6,650,319 discloses complete mapping and screen characterization.

These prior art patents and patent applications reveal the fact that there are two distinct ways detecting touch location on a surface that is capable of propagating acoustic waves. The first approach is to use the real time signal and perform signal processing techniques on the signal to determine the touch location. The issue with this approach is the reflections from boundaries of the substrate and the manufacturing cost as a result of that. The second approach is to characterize the screen and store the characterization information in memory to be compared with the real time data to detect the touch location. This approach requires storage for many points on the screen.

In these respects, the present invention substantially departs from the conventional concepts and designs of the prior art, and in so doing provides an apparatus primarily developed for the purpose of easy calibration and detection of a touch on a given surface. The calibration of the screen is accomplished by touching either a single point or multiple points on the surface. This can be performed either at the factory during the manufacturing of the touch screen or by the end user before the touch screen is placed into service. The present invention provides a touch detection system that can calibrate the screen on a single touch and determines the location of the touch by using a simple algorithm to implement.

In these respects, the touch detection according to the present invention substantially departs from the conventional concepts and designs of the prior art, and in so doing provides an apparatus primarily developed for the purpose of detecting touches on a given surface that overcomes the shortcomings of the prior art.

SUMMARY OF THE INVENTION

In view of the foregoing disadvantages inherent in the known types of touch detection now present in the prior art, the present invention provides a new touch detection system wherein the same can be utilized for detecting touches on a given surface.

The general purpose of the present invention, which will be described subsequently in greater detail, is to provide a new touch detection that has many of the advantages of the touch detection mentioned heretofore and many novel features that result in a new touch detection which is not anticipated, rendered obvious, suggested, or even implied by any of the prior art touch detection, either alone or in any combination thereof.

To attain this, the present invention generally comprises a surface where a touch on the surface generates acoustic waves, transducers that detect these waves, a controller that calculates the location of the touch and a host device where the touch position is used to communicate with the application program. The screen is formed from any material that is capable of propagating acoustic waves. Four transducers are placed on the screen. Signals received by these transducers are applied to timers to detect time differences. These time differences in turn used by the controller unit to calculate the touch location which is communicated to the host device. Driver software is the software that communicates with the controller and receives the touch location information from the controller. Driver also communicates with other application software and operating system to report the touch location that is communicated by the controller unit.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a touch detection that will overcome the shortcomings of the prior art devices.

An object of the present invention is to provide a touch detection for detecting touches on a given surface.

Another object is to provide a touch detection that detects touch on a surface that is capable of transmitting acoustic waves.

Another object is to provide a touch detection that does not require any extensive calibration during manufacturing phase.

Another object is to provide a touch detection system that can be calibrated by a single touch on the screen.

Another object is to provide a touch detection that does not require any special treatment of the surface to block wave reflections from the surface boundaries.

Another object is to provide a touch detection that can detect a touch on a surface regardless the object used. The object can be pen, metal, finger or any other object that would create bending waves on the surface as a result of contact.

Another object is to increase the touch resolution compared to the prior art.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
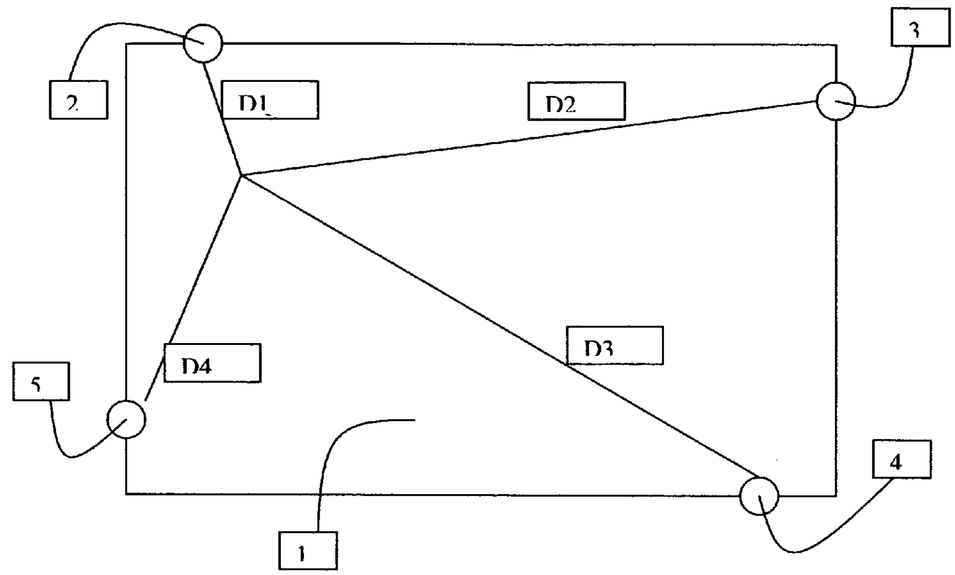
FIG. 1 is Screen.
Figure 2:
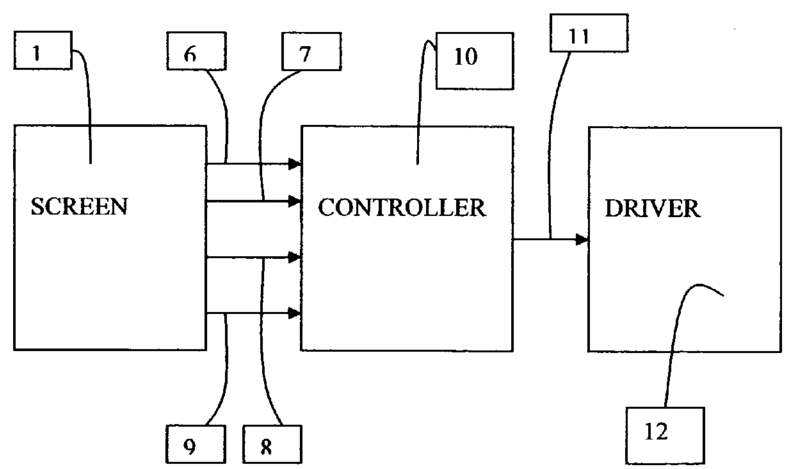
FIG. 2 is System Components.

Turning now descriptively to the drawings, in which similar reference characters denote similar elements throughout the several views, the attached figures illustrate a touch detection, which comprises a surface 1 where a touch on the surface generates acoustic waves, transducers 2, 3, 4, 5 that detect these waves, a controller 10 that calculates the location of the touch and a host device where the touch position is used to communicate with an application program. The screen 1 is formed from any material that is capable of propagating bending waves. Four transducers 2, 3, 4, 5 are placed on the screen 1. These transducers 2, 3, 4, 5 detect bending waves generated on the screen 1. The output of each transducer 2, 3, 4, 5 is sent to the controller unit 10. Controller unit 10 has an amplifier unit 41, a logic gates unit 46, timers 13, 14, 15, 16 and microcontroller 21. Signals coming from the screen 1 are applied to these timers to detect the time differences to be used in determining the touch location. Controller 10 calculates the touch location and communicates this location to the host device. Driver software 12 communicates with the controller 10 and receives the touch location information from the controller 10. Driver 12 also communicates with other application software and operating system to report the touch location that is communicated by the controller unit 10.

The screen 1 is formed from any material that is capable of propagating acoustic waves. Four transducers 2, 3, 4, 5 are placed on the screen 1. These transducers detect acoustic waves generated on the screen. Outputs 6, 7, 8, 9 of transducers 2, 3, 4, 5 are sent to the controller unit 10. Four transducers 2, 3, 4, 5 are placed on the screen to detect bending waves generated upon touching the screen 1.

Controller unit 10 has a microcontroller 21, timers 13, 14, 15, 16, amplifier unit 41 and logic gates unit 46. Other electronics circuits are also used on the controller unit as necessary to accomplish the design goal. Signals 6, 7, 8, 9 coming from the screen 1 are applied to amplifier unit 41. Outputs 42, 43, 44, 45 from the amplifier unit 41 are applied to the logic gates unit 46. The output 47 of the logic gates unit 46 is applied to timers 13, 14, 15, 16 to detect the time to be used to determine the touch location. Other inputs for timer units 13, 14, 15, 16 are signals 42, 43, 44, 45 corresponding to each timer. Controller 10 calculates the touch location and communicates this location to the host device. The controller consists of a microcontroller 21, timers 13, 14, 15, 16, analog amplifier 41 and logic gates 46. There are four timers 13, 14, 15, 16 used in the controller 10. Timers 13, 14, 15, 16 are used to measure the time differences between acoustic waves that arrive from transducers 2, 3, 4, 5 at different times. Controller 10 also has a microcontroller chip 21 on it that performs all the calculations and provides the communication 11 between the controller 10 and the host device. Coordinates of the touch point is communicated to the host device by the controller 10. Timers 13, 14, 15 can be either outside of the microcontroller 21 or inside the microcontroller 21. Microcontroller 21 can be any microcontroller that is capable of executing codes at a given speed. Microcontroller 21 can be incorporated into an application specific integrated circuit or into a field programmable gate array. Amplifiers are used to amplify signals coming from transducers.

Driver software 12 is the software that communicates with the controller 10 and receives the touch location information 11 from the controller 10. Driver 12 also communicates with other application software and operating system to report the touch location that is communicated by the controller unit 10. Driver software can either be in driver form or embedded software for smaller units. The driver 12 communicates with the operating system and sends the coordinate information from the controller 10 to the operating system and other application programs. Driver 12 can be developed utilizing any programming language. Controller can be designed using any given component as long as the time differences are measured and the touch location determined based on that information.

Figure 3:
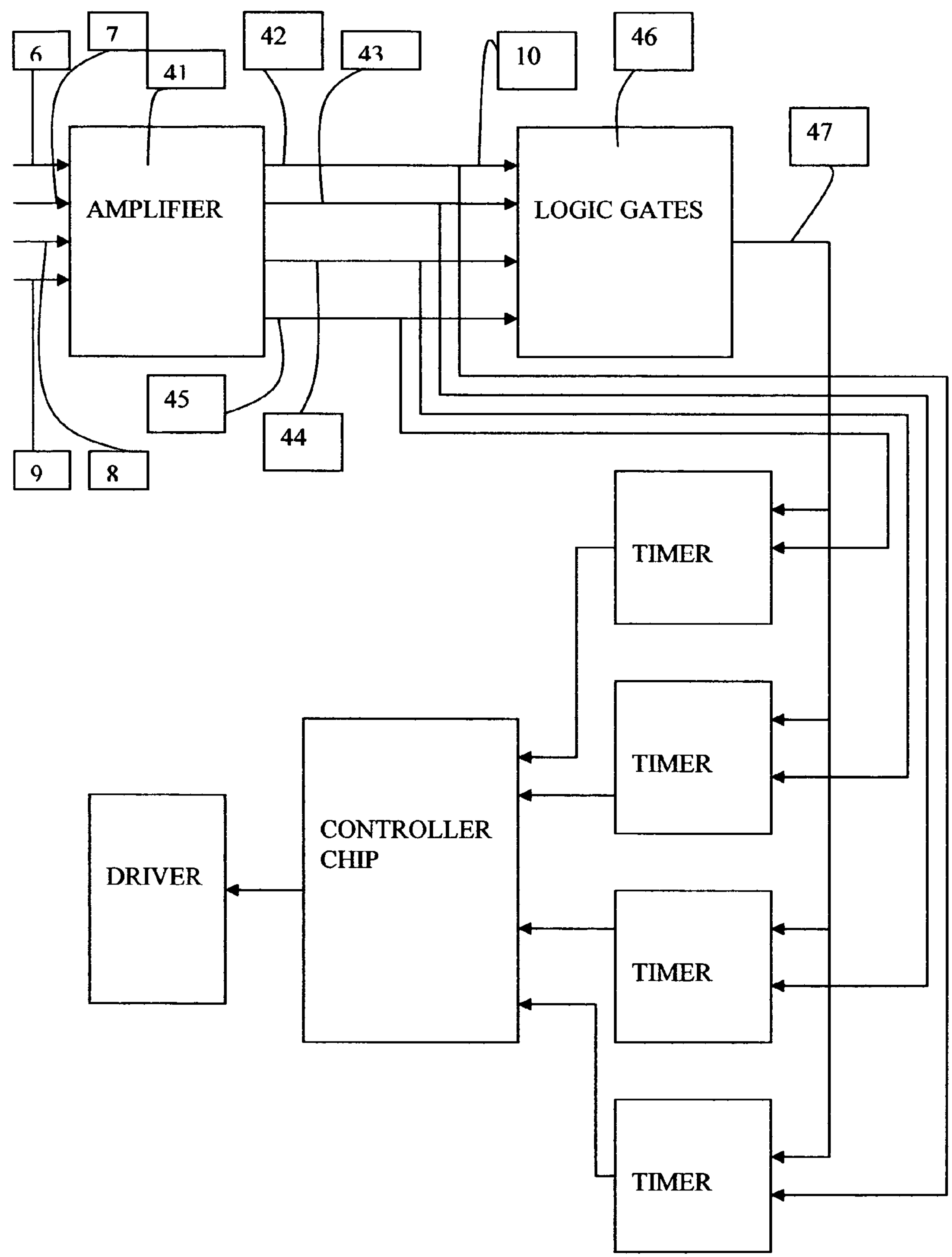
FIG. 3 is Controller.
Figure 4:
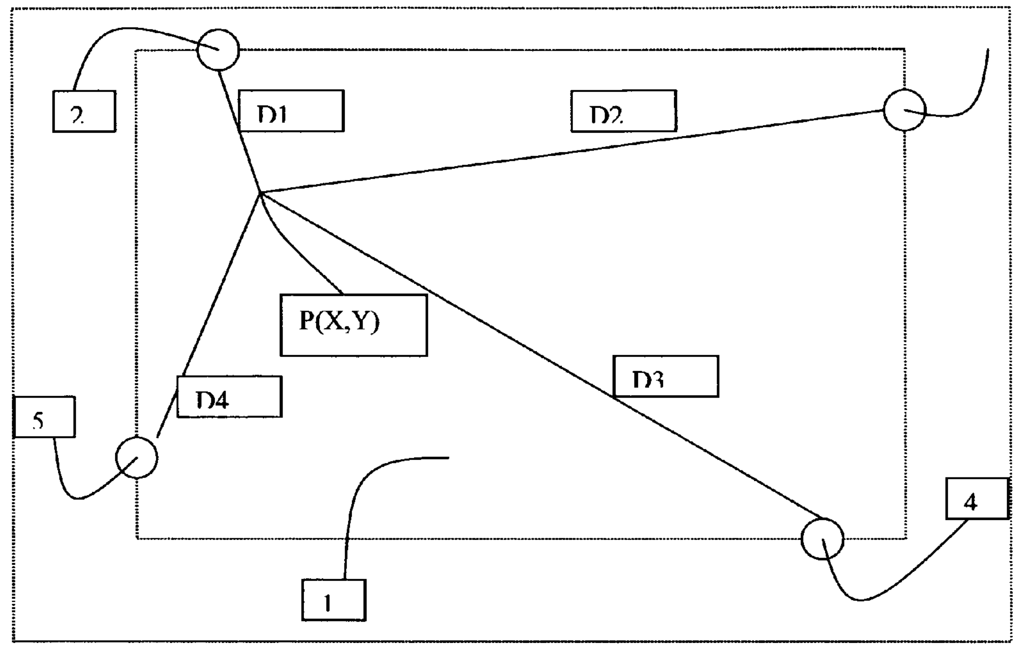
FIG. 4 is Algorithm to calibrate the screen.

The screen 1 is shown in FIG. 1. Four transducers 2, 3, 4, 5 are located on the screen. These transducers 2, 3, 4, 5 are attached to the screen 1 by using glue or any other means to make sure that transducers become part of the screen 1 and detect the acoustic wave vibrations on the screen 1. These waves travel through the screen and arrive to transducers 2, 3, 4, 5 located on the screen. Outputs of transducers 6, 7, 8, 9 are applied to an amplifier 41 where they are amplified as shown in FIG. 3. Amplified signals 42, 43, 44, 45 are applied to a logic gates circuit 46. The output 47 of the logic gates circuit 46 is applied to the input of all timers 13, 14, 15, 16 as a trigger signal. This way whichever signal arrives from transducers 2, 3, 4, 5 first, acts as the trigger to start all timers 13, 14, 15, 16. The other input to timers 13, 14, 15, 16 are corresponding signals from corresponding transducers. For example signal 42 is applied to the other input of timer 13. Signal 43 is applied to the other input of the timer 14. Signal 44 is applied to the other input of timer 15. Signal 45 is applied to the other input of timer 16. Timers 13, 14, 15, 16 start counting upon the input 47 reaching certain threshold level. Timers 13, 14, 15, 16 stop running when the other input reaches certain threshold level. This way the time difference between the arrival of two signals are measured by timers 13, 14, 15, 16. The time difference measured between different waves determines the touch location on the screen 1.

Figure 5:
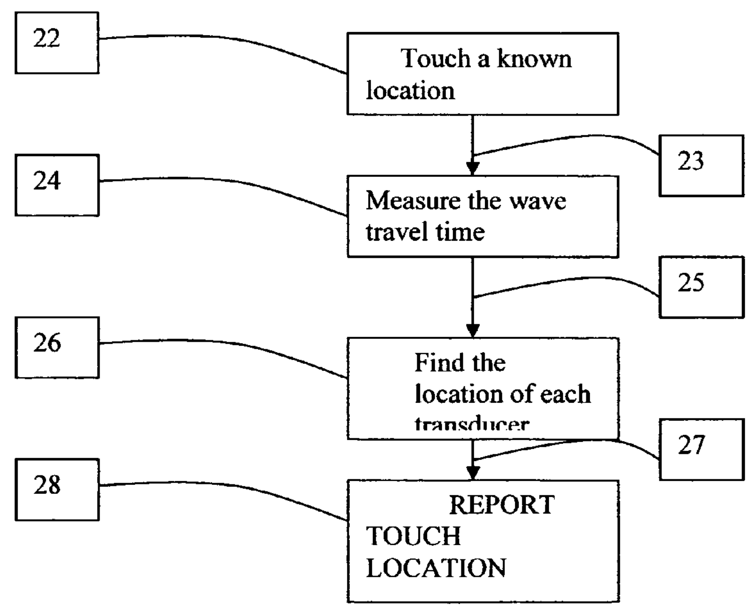
FIG. 5 is Algorithm to detect the touch.

During the calibration process, it is important to know the exact transducer locations to calculate a map of time differences for each point on the screen. This is accomplished by a quick calibration process either during manufacturing or when the unit is set up by the user. This algorithm is shown in FIG. 5. During the calibration phase, it is important to remember that one of the transducers 2, 3, 4, 5 has to be located in the exact known location. Other transducers can be placed in the vicinity of the predetermined locations, however they do not have to be in precise locations. Locations of other transducers are determined by the following approach. The known screen location P which is closer to the known transducer is touched with any material and as a result acoustic waves are generated. These waves arrive to the transducer with the known location. Here, we have chosen transducer 2 as the known location. However any transducer for this purpose can be selected. When the signal from logic gate unit 46 reaches certain level, timers start counting. Timers 13, 14, 15, 16 receive other inputs from the amplifier unit 41. These inputs 42, 43, 44, 45 are used to stop timers 13, 14, 15, 16. When these timers stop, the time that they hold will be equivalent to the time difference of acoustic wave arrivals to different transducers. For example timer 14 will hold the time difference between the acoustic wave arrival to transducer 2 and transducer 3. Timer 15 will hold the time difference between the acoustic wave arrival to transducer 2 and transducer 4. Same is true that timer 16 measures the time difference between the acoustic wave arrival to transducer 2 and transducer 5. As the location of transducer 2 is known, the distance between the transducer 2 and the touch point P can be calculated using the following formula:

$$d^2{}_1=(x-x_1)^2+(w-y)^2 \text{ then } d_1[(x-x_1)^2+(w-y)^2]^{1/2}$$

$$d^2{}_2=(L-x)^2+(y_2-y)^2 \text{ then } d_2=[(L-x)^2+(y_2-y)^2]^{1/2}$$

$$d^2{}_3=(x_3-x)^2+y^2 \text{ then } d_3=[(x_3-x)^2+y^2]^{1/2}$$

$$d^2{}_4=x^2+(y-y_4)^2 \text{ then } d_4=[x^2+(y-y_4)^2]^{1/2}$$

$$(d_1-d_2)/(d_1-d_3)=a \text{ then } k-[(L-x)^2+(y_2-y)^2]^{1/2}=a(k-[(x_3-x)^2+y^2]^{1/2})$$

$$(d_1-d_2)/(d_1-d_4)=b \text{ then } k-[(L-x)^2+(y_2-y)^2]^{1/2}=b(k-[x^2+(y-y_4)^2]^{1/2})$$

$$(d_1-d_3)/(d_1-d_4)=c \text{ then } k-[(x_3-x)^2+y^2]^{1/2}=b(k-[x^2+(y-y_4)^2]^{1/2})$$

Using these formulas, the location of the other three transducers are determined. These calculations can be done either during manufacturing or by the user when the unit was first set up. In either case, these calculations are done once and are not repeated during the real time operation. Once the locations of all the transducers are known, the screen map can be calculated. That is, the ratio of time differences for the acoustic wave to reach each transducer from every point on the screen. Working with ratios, eliminates the frequency dependency. Higher frequencies are generated by certain material such as metal travel faster than lower frequencies. On the other hand softer material such as finger generates lower frequencies. To be able to produce a screen that is not sensitive to a certain material and therefore to a certain frequency, the ratios of time differences are used. Based on this theory, the time difference ratio for each point on the screen is calculated and stored in the memory. This can either be done at the manufacturing phase or when the user touches the screen during the set up. Formulas that are used to calculate the distance from each point to different transducers 2, 3, 4, 5 are given below:

$$d_1=[(x-x_1)^2+(w-y)^2]^{1/2}$$

$$d_2=[(L-x)^2+(y_2-y)^2]^{1/2}$$

$$d_3=[(x_3-x)^2+y^2]^{1/2}$$

$$d_4=[x^2+(y-y^4)^2]^{1/2}$$

$$(d_1-d_2)/(d_1-d_3)$$

$$(d_1-d_2)/(d_1-d_4)$$

$$(d_1-d_3)/(d_1-d_4)$$

Figure 6:
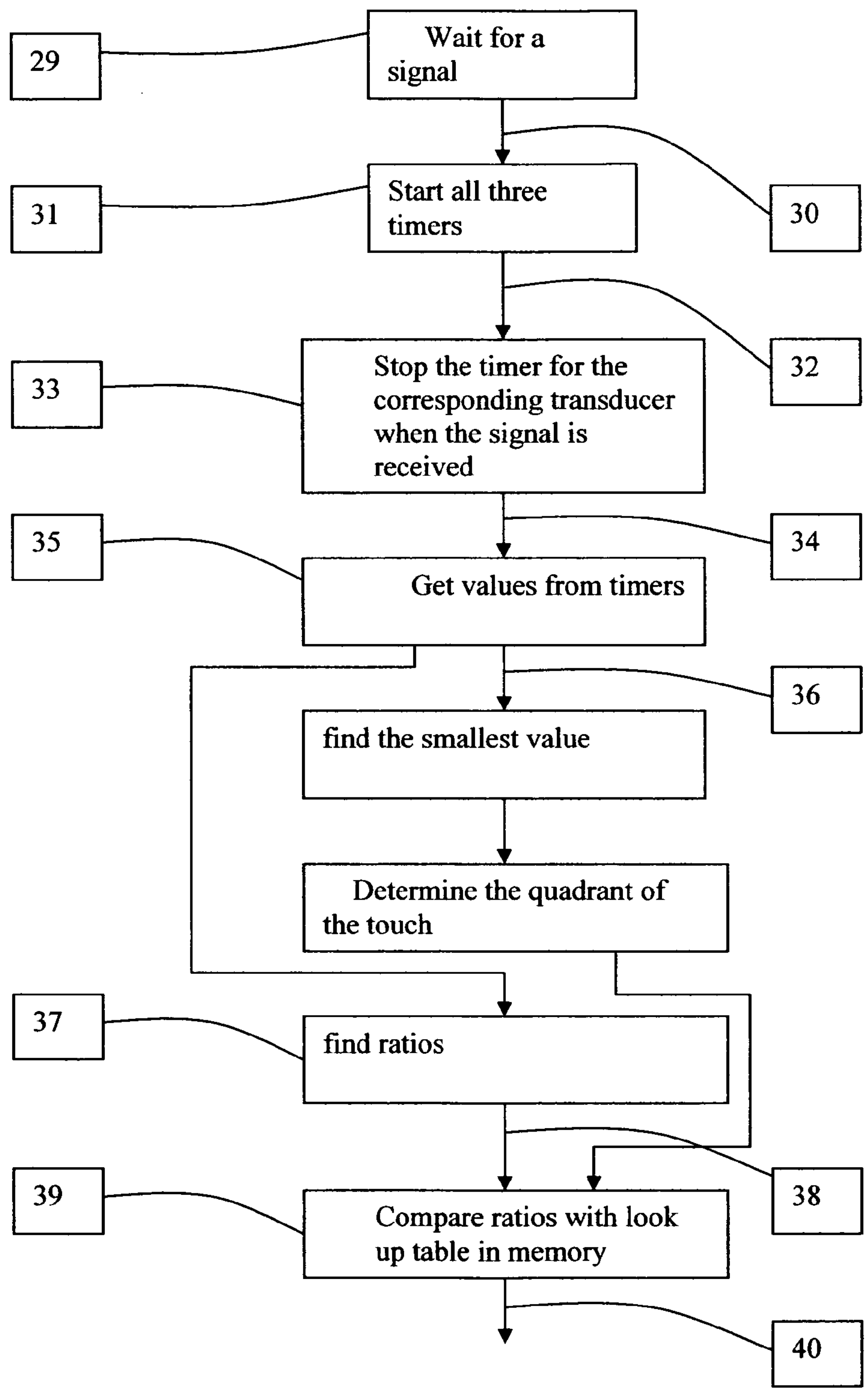
FIG. 6 is Geometry to determine transducer locations.

There are three different ratios for each point. These ratios are stored in three different LUT (look up tables) and are later used to determine the touch point on the screen. Three look up tables are sorted from smaller ratio to larger ratio. Look up tables can either be stored in the controller 10 or in the host device. The touch detection algorithm is shown in FIG. 6. When the screen is touched during the normal operation, acoustic waves are generated and detected by transducers 2, 3, 4, 5. Output signals 6, 7, 8, 9 from transducers 2, 3, 4, 5 are applied to the amplifier 41. The output 47 of the logic gates unit 46 is applied to timers 13, 14, 15, 16 along with the outputs 42, 43, 44, 45 from the amplifier unit 41. Time differences are calculated by these timers 13, 14, 15, 16. Ratios are calculated by the microcontroller and these ratios are compared with the ratios in three LUTs to find the touch location. Binary search technique is used to speed up the search within the look up table. This search can either be performed by controller 10 or the host system. Each entry in the look up table has to be large enough number to accommodate any time difference that might be generated on the screen 1. Number of bits for each timer is determined by the clock frequency used for the timers 13, 14, 15, 16. The higher the frequency, the larger the number and the larger the touch resolution. The number of bits per timer is determined by the following formula:

$$t=md/v$$

Where "m d" is the minimum distance to be detected, "v" is the velocity of the bending wave in a given material and the "t" is the time it takes for the wave to travel to a given transducer. Based on these calculations, certain number of bits are set to handle the maximum possible wave travel value on the screen. The number of bits can be changed based on the screen size.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A touch detection device comprising: a substrate; a plurality of sensors on the substrate for receiving acoustic waves and generating corresponding signals in response to received acoustic waves a controller connected to the sensors; and an algorithm means for calculating ratios of arrival time differences of acoustic waves from a touch point to the sensors and comparing the ratios with those stored in a storage unit.

2. The touch detection device in accordance with claim 1, wherein said controller comprises an amplifier for amplifying the received signals; a logic gates unit for receiving the amplified signals and, generating a trigger signal; a plurality of timers corresponding to the sensors for receiving the trigger signal and amplified signals respectively and measuring arrival time differences between the received signals caused by the acoustic waves that arrive from the sensors at different times; and a microcontroller for processing the arrival time differences, and finding the ratios of arrival time differences and comparing the ratios of arrival time differences of that stored in the storage unit to determine the touch location of the touch point.

3. The touch detection device in accordance with claim 1, further comprising a driver means for communicating with the controller and receiving touch location information from the controller.

4. A touch detection system comprising: a substrate for providing a base for the system; a plurality of sensors for receiving acoustic waves and generating corresponding signals in response to received acoustic waves; a controller for processing the signals and detecting a touch point; a host device for communicating the location of the touch point with the controller; and an algorithm means for calculating ratios of arrival time differences of acoustic waves from the touch point to the sensors and comparing the ratios with those stored in a storage unit to determine the location of the touch point.

5. The touch detection system in accordance with claim 4, wherein said means for calculating time differences comprises timers that count wave travel time from the touch point to sensors.

6. The touch detection system in accordance with claim 4, wherein said host device is a portable device.

7. The touch detection system in accordance with claim 6 wherein said substrate is located on the portable device.

8. The touch detection system in accordance with claim 6, wherein said controller is a part of the portable device.

9. The touch detection system in accordance with claim 6, wherein said algorithm means resides in the portable device.

10. The touch detection system in accordance with claim 5, wherein said timers are implemented in hardware or software.

11. The touch detection system in accordance with claim 4, further comprising a driver means for communicating with the controller and receiving touch location information from the controller.

12. The touch detection system in accordance with claim 4, wherein said controller comprises an amplifier for amplifying the received signals; a logic gates unit for receiving the amplified signals and generating a trigger signal; a plurality of timers corresponding to the sensors for receiving the trigger signal and amplified received signals respectively and measuring arrival time differences between the received signals caused by the acoustic waves that arrive from the sensors at different times; and a microcontroller for processing the arrival time differences to determine the touch point.

13. The touch detection system in accordance with claim 4, wherein said algorithm means resides in the controller.

14. A touch detection system comprising: a substrate for providing a base for the system; a plurality of sensors for receiving acoustic waves and generating corresponding signals in response to received acoustic waves; a controller for processing the signals and detecting a touch point; a host device for communicating the location of the touch point with the controller; and an algorithm means for calculating ratios of arrival time differences of acoustic waves from the touch point to the sensors and comparing the ratios with those stored in a storage unit to determine the location of the touch point, wherein the ratios stored in the storage unit are determined based on the ratios of arrival time differences for different points on the substrate, which are calculated by the arrival times of the acoustic waves to a sensor with know locations; and the arrival times are determined based on one or more predetermined touch points.

15. The touch detection system in accordance with claim 14, wherein said storage is implemented as a stand alone chip.

16. The touch detection system in accordance with claim 14, wherein said controller comprises an amplifier for amplifying the received signals; a logic gates unit for receiving signals and generating a trigger signal: a plurality of timers corresponding to the sensors for receiving the trigger signal and amplified received signals respectively and measuring arrival time differences between the received signals caused by the acoustic waves that arrive from the sensors at different times; and a microcontroller for processing the arrival time differences to determine the touch point.

17. The touch detection system in accordance with claim 14, wherein said algorithm means resides in the controller.

18. The touch detection system in accordance with claim 14, wherein the storage unit is implemented in the controller or the host device.

19. A method of determining a touch location in a touch device comprising steps of:

finding ratios of arrival time differences; correlating the ratio of arrival time differences with ratios of arrival time differences stored in a storage unit; finding the touch location based on the correlation results.

20. A method in accordance with claim 19, wherein the step of finding ratios of arrival time differences comprising the steps of: detecting arrival time differences between a sensor and other sensors; and calculating ratios of arrival time differences based on the arrival time differences.

21. A method for a touch detection system comprising an algorithm including steps of touching one or more predetermined locations on a screen; measuring the arrival times of acoustic waves to a sensor whose location is known; calculating ratio of arrival time differences between the sensor and other sensors; finding locations of other sensors by using the ratios of arrival time differences; calculating ratios for different points on the screen to generate a ratios map for the screen; and storing the generated ratios map in a storage unit.

* * * * *